2,762,727

PROCESS FOR PRODUCING DEXTRAN PRODUCTS SUITABLE FOR PHARMACEUTICAL AND THERAPEUTIC PREPARATIONS

Irving Levi, Montreal, Quebec, and Ezra Lozinski, Westmount, Quebec, Canada, assignors to Charles E. Frosst & Co., Montreal, Quebec, Canada No Drawing. Application May 5, 1952,
Serial No. 286,202

2 Claims. (Cl. 127—36)

This invention relates to the production of partially depolymerized, non-pyrogenic dextran suitable for pharmaceutical and therapeutic use and particularly in infusions or injection solutions intended as blood or blood plasma extenders.

According to the invention there is provided a process for the degradation of high molecular weight dextrans and the destruction of pyrogens which may be present therein, by one agent either simultaneously or in successive steps.

It is an object of this invention to produce medium molecular weight polymeric homologues of dextrans of a range suitable for therapeutic transfusion fluids for use by infusion in the circulatory system as a blood extender.

It is a further object of this invention to provide a suitable means of depolymerizing high molecular weight homologues of dextrans.

It is a further object to prepare pyrogen free dextran and dextran solutions suitable for use as a plasma extender.

A still further object of the invention is to obtain the economy in time and effort of a simultaneous depolymerization and pyrogen destruction process by employing hydrogen peroxide to obtain both effects.

It has long been known that water-soluble polysaccharides may be produced by microbiological fermentation of sugars. The bacterium *Leuconostoc mesenteroides* and its related species, *Leuconostoc dextranicum*, are capable of producing in saccharose solutions under favourable conditions a polysaccharide known as dextran. It has also been known since 1938 when Stacey and Youd published in The Biochemical Journal, vol. XXXII, No. 11, pp. 1943–1945, that such high molecular weight native dextran may be partially depolymerized by the action of dilute acid and alkali at appropriate temperatures.

Dextran is a long chain branched polysaccharide whose chemical formula is given in the literature as $(C_6H_{10}O_5)_n$ where $n$ is an integral number. Chemically these polymeric homologous dextrans differ from other polysaccharides such as glycogen and starch in that the glucose units are joined together in 1:6 glucosidic links. The main chain of the glucose units so formed has short side branches at frequent intervals which, according to an earlier work of one of us, are shown to be joined through 1:4 glucosidic linkages. (Levi, Hawkins, Hibbert, J. Am. Chem. Soc. 64: 1959, 1942.) It has been shown that these dextrans produced by various strains of Leuconostoc differ in the extent of their branching: that there is no fixed molecular size at which the chain making stops; and that any culture will contain a whole range of sizes. In their native state the dextran chains may be composed of up to 200,000 glucose units corresponding to a molecular weight of up to 32 million. Since, for parenteral infusion or injection solutions, molecules of a medium range are desirable, it is necessary when preparing dextran for such use to separate the dextran molecules lying within the desired range, from those which are too large and those which are too small. The preferred molecular range of polymeric homologues of dextrans includes those which have a molecular weight within the range of approximately 15,000 to 270,000. Native dextrans or only slightly depolymerized very high molecular weight unfractionated dextrans, when infused intravenously, will cause injurious reactions to liver and kidneys. Such are unsuitable for use as blood or blood plasma extenders in the circulatory system.

Where used in this specification the expression "polymeric homologues" refers to molecules built mainly similar in structure to those of the starting materials but having another and, in the case of depolymerized dextran, a lower molecular weight.

Until the present invention the method most widely used for the partial depolymerization of dextran has been that involving the use of acid, published by Stacey and Youd, Biochem, J. 32: 1943. Other less satisfactory methods which have been proposed for this process of partial depolymerization include alkaline degradation (see Lockwood, A. R., presented before Birmingham Section Society Chemical Industries, December 13, 1950: Manufacturing Chemist, vol. 22, No. 2, p. 58, February 1951), and the uneconomical processes involved in the slow breakdown by bacterial enzymes (Hutlin E. and Nordstrom L., Acta Chem. Scand. 3: 1405, 1949) and ultrasonic vibration, (Chem. Eng. News 29: 651, 1951).

In addition to possessing a desirable limited range of medium sized molecules, the dextran product for intravenous use as a blood extender must be free from local and general toxicity. Although dextran may be produced under conditions which would rigidly exclude casual contamination, pyrogens produced during fermentation enter the product. The elimination of these pyrogens in solutions for intravenous use is necessary and, indeed, mandatory. Hitherto it has required special treatment of the dextran product either before or after the depolymerization process. Pyrogens are nondializable fever-producing substances of as yet unknown composition, the removal of which from a variety of injectables has long been attended with difficulties. No satisfactory general method applicable to all injection solutions is known. The utility of past methods has, in some cases, left much to be desired. Seitz filters have been employed both with and without pretreatment with adsorptive agents such as charcoal. Some injection solutions may be rendered nonpyrogenic (also expressed as apyrogenic) by autoclaving at certain individually ascertained temperatures and pressures, a procedure not applicable to heat labile substances.

By the present invention there is presented a process whereby native dextrans or slightly depolymerized dextrans (containing a high proportion of macro-molecular dextrans above the preferred range mentioned hereinbefore), may while in solution be partially depolymerized under controlled conditions and simultaneously rendered non-pyrogenic. These partially depolymerized fractionated dextrans isolated by selective precipitation procedures hereinafter described, are suitable for use as therapeutic preparations for infusion or injection fluids as extenders of blood and blood plasma in the circulatory system.

This invention consists broadly in subjecting aqueous solutions of dextran (approximately less than 1% to saturated solutions) to the action of hydrogen peroxide in such concentration as to give a final concentration equivalent to between 0.001 and 0.1 M. hydrogen peroxide, at temperatures ranging from 25° C. to 150° C. and under pressures up to 30 p. s. i. g. for a period of time which, in relation to the preceding variants, may range from several minutes up to several days, whereby, to effect the simultaneous controlled molecular depolymerization and pyrogen destruction of such dextran-containing solutions; thereafter to effect the removal of extraneous matter by known means and through the use of fractionation techniques to first precipitate the high molecular weight dextrans, and then separate from the solution those of the desired medium molecular weight sizes within the aforesaid range. These fractionation techniques consist of the selective precipitation from aqueous solution by careful introduction of acetone, ethanol, or other water miscible solvent in which the depolymerized dextran is itself insoluble. The selected medium molecular weight polymeric homologues of dextrans thus isolated are suitable for therapeutic use as blood extenders when made into infusion or injection solutions according to published methods. By observing definite conditions of concentration of native dextran (or very high molecular weight dextrans), and of the hydrogen peroxide in relation to those of time, temperature and pressure, it is possible to control the degree of depolymerization of the starting material within desired limits. Since the controlling factors of concentration of dextran-containing solutions, concentration of hydrogen peroxide, of time, temperature and pressure may be varied within wide limits not shown in the examples, there exists the possibility of conducting the depolymerizing step under conditions not specified within the scope of the examples given due to the interdependence of these factors on each other.

Table III in Example 4 illustrates the effect on the relative viscosity of the product, and thus the extent of depolymerization of varying concentrations of hydrogen peroxide on native dextran solutions of 1%, 6% and 12% under varying conditions of time, temperature, and pressure. It will be seen that a low concentration of depolymerizing agent requires for the same percentage solution of dextran a comparatively long depolymerization time and/or an elevated temperature. Conversely, with a high concentration of depolymerizing agent a dextran-containing solution of equal concentration is depolymerized in a comparatively short time at the same temperature and/or pressure.

Since the invention relates also to the action of pyrogen destruction by the same agent as effects the depolymerization, it is important at all times to use sufficient peroxide of hydrogen to ensure a satisfactory pyrogen test in the final dextran-containing product used for intravenous infusion. Thus any variation of the interrelated factors of concentration of dextran in aqueous solution, concentration of depolymerizing-pyrogen detoxifying agent, time, temperature, and pressure must be made with due regard for the minimum concentration of peroxide of hydrogen necessary to render the dextran solution non-pyrogenic if an extra step of removal of pyrogens is to be avoided and a product satisfying an acceptable pyrogen test thereby produced. Cognizance should be given to the fact that the degree of pyrogen contamination may be expected to vary from batch to batch.

It is known that the extent of depolymerization of a dextran-containing solution is indicated by its relative viscosity. Consequently successive measurements of relative viscosity at successive stages in the fractionation of the depolymerized and apyrogenic solutions will enable the desired dextran range to be selected. By relative viscosity is meant, for the purpose of this specification, the ratio of the viscosity at 25° C. of a solution of 6 grams weight of dextran in 100 mls. of water, to the viscosity of water, both being measured in an Ostwald viscometer having a water flow time of 80–100 seconds.

Slightly depolymerized or unfractionated high molecular weight dextrans resulting from a mild uncontrolled action of dilute mineral acid or dilute alkali have been known since the publication of Stacey and Youd, The Biochemical Journal, vol. 32, No. 11, p. 1943 (1938). Since hydrogen peroxide is herein used as a depyrogenating agent and as a partial depolymerizing agent, it is a feasible alternate manner of exercising this invention to submit such slightly depolymerized dextrans, resulting from a slight or mild acid or alkali treatment, and still containing a proportion of macromolecules which in solution would be of a relative viscosity in excess of that suitable for clinical use, to the action of hydrogen peroxide under conditions outlined in the following examples to produce partially depolymerized, apyrogenic, water soluble dextran which, in 6% solutions in water, have a range of relative viscosity ratios suitable for clinical purposes.

By using the above means and standard of measuring relative viscosity, the depolymerized, apyrogenic dextrans produced by the action of hydrogen peroxide according to this invention, when dissolved in water in a concentration of 6% exhibit a range of relative viscosities of 1.5 to approximately 82.0. From this range there is selected for the purpose of preparing blood transfusion fluids, depolymerized dextrans falling within the narrower range of relative viscosity ratios of 2–6. No international standard as yet has been adopted. The present standard in the United States, and it is a tentative one, requires an optimum range of 3.2–3.8 with outside limits of 2.7–4.3 using an Ostwald viscometer calibrated in relation to water at 20° C.

The invention will be described in greater detail with the aid of the following examples which serve to illustrate the flexibility of the invention but are not intended to indicate its limits or depart from the spirit of the invention as claimed.

EXAMPLE 1

190 grams of native dextran ($[\alpha]_D^{25} + 181.1 \pm 2.3$, $c=1\% H_2O$) were dissolved in 3166 cc. water and sufficient 30% aqueous hydrogen peroxide solution was added to give a final concentration of 0.01 M. hydrogen peroxide. The solution was heated in an autoclave at 15 p. s. i. g. (121° C.) for 20 minutes. The relative viscosity of the solution was 2.80.

200 mls. of the depolymerized solution was withdrawn and the dextrans were precipitated with 200 cc. acetone. The precipitate was dried and then dissolved in water to give a 6% solution. The relative viscosity of this solution was 3.41.

The remainder of the depolymerized solution which had an approximate volume of 3000 mls. and a pH of 4.15 was neutralized with a 10% NaOH solution of pH 6.5. To this solution, while stirring rapidly, was added in a fine stream in a careful stepwise manner, 1375 mls. of acetone to effect the precipitation of dextran fraction No. 1. (See Table I.) The precipitate so formed was allowed to settle by cooling in a refrigerator at 5°–10° C., then the clear supernatant solution was decanted from the precipitated dextran, warmed to room temperature, and the acetone precipitation process repeated for the successive removal of fractions 2–7 inclusive. The precipitated dextran obtained in each fractionation step was dried and dissolved in 0.85% saline to give 6% solutions of polymeric homologues of dextran. The viscosity and $[\alpha]_D^{25}$ characteristics of each fraction in 6% solution were determined. The results are tabulated in Table I.

*Table I*

| Fraction No. | Mils acetone added | Grams | Relative Viscosity of 6% sol'n at 25° C. | $[\alpha]_D^{25}$, ($c=1\%$ $H_2O$) |
|---|---|---|---|---|
| 1 | 1,375 | 13.0 | 9.48 | 180.16±1.36 |
| 2 | +150 | 47.7 | 4.55 | 180.93±3.60 |
| 3 | +100 | 20.4 | 3.53 | 180.16±2.40 |
| 4 | +200 | 19.7 | 2.84 | 179.88±2.20 |
| 5 | +300 | 23.2 | 2.44 | 183.21±2.80 |
| 6 | +500 | 11.6 | 2.00 | 182.55±1.55 |
| 7 | +1,800 | 19.1 | 1.81 | 106.15±1.40 |

Fractions 2, 3, 4 and 5 were selected as falling within the preferred range of relative viscosity for transfusion fluids and made up into 6% solutions in water or normal saline and were prepared and tested in accordance with established standards for transfusion fluids.

It is apparent that the optical rotation of the various fractions numbers 1–6 are within the limits of those exhibited by the staring material, i. e. native dextran. All fractions numbers 1–6 still exhibit the gross structure of the original dextrans and are polymeric homologues of the starting material.

EXAMPLE 2.—BUFFERED SOLUTIONS OF DEXTRAN

Six grams of native dextran were dissolved in 100 mls. of distilled water, buffered to pH 6.7 with 25 mls. of 0.2 M. $KH_2PO_4$ plus 11.8 mls. of 0.2 M. NaOH. To this buffered solution was added 0.9 mls. of hydrogen peroxide containing 0.032 grams hydrogen peroxide per ml. solution to give a final concentration of 0.01 M. hydrogen peroxide. The solution was autoclaved at 15 p. s. i. g. (121° C.) for 20 minutes. The viscosity of final solution was 3.30 (unfractionated) and the pH of the final solution was 6.58.

When native dextran solutions are treated with aqueous hydrogen peroxide in the concentration specified in this specification and in the appended claims at temperatures of approximately 120° C. and pressures of approximately 15 p. s. i. g., the pH of the solution changes from approximately pH 7 to approximately pH 4–4.5. However, if the original solution of native dextran is buffered to a pH 6.7–6.9 with the buffer mixtures of Clark and Lubs (U. S. P. XIV, page 972), there is very little change in the pH of the final solution. Consequently, it is not necessary to neutralize the final depolymerized dextran solution as is the case when depolymerization is carried out in the absence of a buffer or by acid hydrolysis. Such neutralization, when necessary, is often a cause of undesirable discoloration. Buffering helps to ensure the production of a water-white solution.

EXAMPLE 3

A series of native dextran solutions was prepared by dissolving 1.2 grams of dextran in distilled water and adding sufficient amounts of 0.1 molar hydrogen peroxide to give final solutions containing 6% dextran and molarities of hydrogen peroxide as shown in the table below. All of the solutions were heated in an autoclave at 15 p. s. i. g. (121° C.) for 20 minutes. The relative viscosities of the solutions were then determined and are listed in the table below (Table II).

Table II

| Solution No. | Molarity of $H_2O_2$ | Relative viscosity of Depolymerized Solution |
|---|---|---|
| 1 | 0.00 | approximately 760. |
| 2 | 0.001 | 82.0. |
| 3 | 0.002 | 26.2. |
| 4 | 0.004 | 8.82. |
| 5 | 0.006 | 5.94. |
| 6 | 0.008 | 5.05. |
| 7 | 0.010 | 3.38. |
| 8 | 0.020 | 2.22. |
| 9 | 0.030 | 1.85. |
| 10 | 0.040 | 1.61. |
| 11 | 0.050 | 1.57. |

EXAMPLE 4

A series of native dextran solutions was prepared which contained either 1%, 6%, or 12% dextran and .10, .02, .01 or .001 mole hydrogen peroxide. The depolymerizations were carried out under varying conditions of temperature, pressure, and time. The relative viscosity of each solution was determined; Table III summarizes these experiments.

Table III

| Solution No. | Percent Dextrans | Moles $H_2O_2$ per litre | Depolymerization Conditions | | Time | Relative Viscosity of Depolymerized Sol'n. |
|---|---|---|---|---|---|---|
| | | | Pressure | Temperature, ° C. | | |
| 1 | 1 | .01 | 5 p. s. i. g. | 109 | 5 mins | 4.80 |
| 2 | 12 | .10 | 5 p. s. i. g. | 109 | 5 mins | 18.36 |
| 3 | 1 | .001 | Atmospheric | 100 | 30 mins | 1.96 |
| 4 | 6 | .01 | do | 100 | 30 mins | 3.83 |
| 5 | 12 | .01 | do | 100 | 30 mins | 21.5 |
| 6 | 12 | .02 | do | 100 | 30 mins | 8.68 |
| 7 | 6 | .01 | do | 25 | 119 hours | 36.4 |
| 8 | 6 | .01 | do | 25 | 146 hours | 14.7 |
| 9 | 6 | .01 | do | 25 | 172 hours | 9.2 |
| 10 | 6 | .10 | do | 25 | 119 hours | 2.04 |
| 11 | 1 | nil | | | | 6.35 |
| 12 | 6 | nil | | | | 760 |
| 13 | 12 | nil | | | | (¹) |

¹ Too viscous for Ostwald viscometer.

EXAMPLE 5

Two solutions of native dextran were prepared by dissolving two separate 6 gram portions of dextran in two separate quantities of 100 mls. distilled water to give a final solution of approximately 6% dextran. The dextran used was prepared by growing the organism *Leuconostoc mesenteroides* in a medium containing sucrose. The resulting native dextran was isolated and carefully purified. The relative viscosity of these 6% solutions was so great (approximately 760) that it could not be measured accurately with an Ostwald viscometer. To one of these solutions was added sufficient of 30% aqueous hydrogen peroxide solution to give a final concentration of 0.02 mole of hydrogen peroxide. No hydrogen peroxide added to the other solution. Both were heated in an autoclave at 15 p.s. i. g. (121° C.) for 20 minutes. After autoclaving it was found that the solution to which hydrogen peroxide had been added had a relative viscosity of 2.22 and was nonpyrogenic when tested according to the pyrogen test of the United States Pharmacopeia XIV (maximum rise 0.3° C.) the other solution to which no hydrogen peroxide had been added was still so viscous that the relative viscosity could not be measured with an Ostwald viscometer.

EXAMPLE 6.—DEMONSTRATES DESTRUCTION OF PYROGENS

Two solutions of dextran were prepared by dissolving two separate 6 gram portions of dextran in two separate portions of 100 mls. distilled water to give approximately 6% dextran solutions. The dextran employed was a highly purified fraction obtained from native dextran by mild acid hydrolysis followed by careful fractional precipitation with acetone. The viscosity of the solutions as measured with an Ostwald viscometer according to the aforementioned standard was 6.10. To one of these solutions was added sufficient 30% aqueous hydrogen peroxide solution to give a final concentration of 0.1 M. hydrogen peroxide. No hydrogen peroxide was added to the second solution. Both solutions were heated in an autoclave at 15 p. s. i. g. (121° C.) for 20 minutes. After autoclaving it was found that the solution to which hydrogen peroxide had been added had a viscosity of 1.82 and was nonpyrogenic when tested according to the pyrogen test of the United States Pharmacopoeia XIV (maximum rise 0.5° C.). The other solution to which no hydrogen peroxide had been added had a viscosity of 6.00 and was definitely pyrogenic (maximum rise 0.8° C.).

The action of 0.1 M. hydrogen peroxide therefore destroyed the pyrogenicity of the dextran solution and reduced the viscosity from 6.10 to 1.82.

During the course of the experimentation on certain aspects of this invention, the action of the alkali metal peroxides and other metal peroxides was explored. It was found that solutions of alkali metal peroxides do not depolymerize dextran solutions as smoothly and reliably as do solutions of hydrogen peroxide. Sodium perioxide, for example, when dissolved in water liberates hydrogen peroxide and simultaneously forms sodium hydroxide; and since hydrogen peroxide is not stable in the presence of alkali, much of the hydrogen peroxide is decomposed with the evolution of oxygen. Thus much hydrogen peroxide is lost and is not available for the depolymerization or rendering the dextran solutions nonpyrogenic. Hence, while the hydrogen peroxide employed in accordance with this invention may be obtained indirectly from alkali metal peroxides and other metal peroxides, the direct addition of hydrogen peroxide as described herein is recommended as the preferred procedure.

The embodiments of the invention in which an exclusive property or privilege is claimed are defined as follows:

1. A process of preparing polymeric homologues of dextran comprising subjecting aqueous solutions of high molecular-weight dextran of approximately 1% to saturated solutions to the action of hydrogen peroxide at a final concentration of between 0.001 and 0.1 M. hydrogen peroxide at temperatures ranging from 25° C. to 150° C. and under pressures up to 30 p. s. i. g for a period of time varying from several minutes up to several days, dependent upon the concentration of the dextran and the hydrogen peroxide and the selected temperatures and pressures, so that positive depyrogenization of the dextran takes place with only partial fractionation thereof and then selectively precipitating from the resulting apyrogenic solution fractions of water-soluble partially depolymerized apyrogenic dextrans which, at a concentration of 6% by dry weight in aqueous solution exhibit relative viscosity values of from 1.5 to 82.0.

2. The process of claim 1, comprising the additional step of dissolving, in an apyrogenic aqueous medium, 6% by dry weight of apyrogenic polymeric homologues of dextran selected from a range of the precipitated dextran fractions which, at a concentration of 6% by weight in aqueous solution, exhibit relative viscosities of from 2–6 as determined by an Ostwald viscometer at 25° C.

References Cited in the file of this patent

UNITED STATES PATENTS

| | | |
|---|---|---|
| 2,076,889 | Hees | Apr. 13, 1937 |
| 2,335,126 | Lilienfeld | Nov. 23, 1943 |

FOREIGN PATENTS

| | | |
|---|---|---|
| 496,200 | Belgium | Oct. 2, 1950 |

OTHER REFERENCES

Menczel: J. American Pharm. Association, XL, 175–6 (1951).

Bennett: Proc. Soc. Expt'l. Biol. and Med., volume 81, Number 1, pages 266 to 268, October 1952.

Bibliography—Supersonics or Ultrasonics, 1926–1949, page 30. Published by Research Foundation, Okla. A and M College, Stillwater, Okla., March 1, 1951.

OSRD—Blood Substitutes Report No. 26, July 1, 1943.

Science, volume 102, No. 2656, pages 535 to 536, November 23, 1945.

Thorsen: The Lancet, pages 132 to 134, January 22, 1949.